United States Patent
Cho

(10) Patent No.: US 8,395,818 B2
(45) Date of Patent: *Mar. 12, 2013

(54) IMAGE FORMING APPARATUS ANALYZING COLOR CHROMINANCE DATA TO DETERMINE TYPE OF DOCUMENT TO BE PRINTED

(75) Inventor: Jeong Hwan Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,512

(22) Filed: May 2, 2012

(65) Prior Publication Data

US 2012/0212785 A1    Aug. 23, 2012

Related U.S. Application Data

(63) Continuation of application No. 12/035,807, filed on Feb. 22, 2008, now Pat. No. 8,194,284.

(30) Foreign Application Priority Data

Feb. 28, 2007 (KR) .................. 2007-20266

(51) Int. Cl.
    H04N 1/50 (2006.01)
    H04N 1/56 (2006.01)
(52) U.S. Cl. .................. 358/2.1; 358/3.24; 358/518
(58) Field of Classification Search .................. 358/1.9, 358/2.1, 3.24, 518, 520, 521
    See application file for complete search history.

(56) References Cited

U.S. PATENT DOCUMENTS

| 5,361,147 A | 11/1994 | Katayama et al. |
| 6,268,939 B1 | 7/2001 | Klassen et al. |
| 7,724,400 B2 * | 5/2010 | Cousins et al. ............... 358/518 |
| 2003/0202193 A1 | 10/2003 | Yokochi |

FOREIGN PATENT DOCUMENTS

| JP | 01101152 | 4/1989 |
| JP | 9-277606 | 10/1997 |
| JP | 2005-316893 A * | 11/2005 |

OTHER PUBLICATIONS

European Patent Office Search report dated Apr. 15, 2011 in Application No. 08102369.9-1228/1968303.
First Office Action, mailed Apr. 13, 2010, in corresponding Chinese Application No. 200810148092 (9 pp.).
Office Action mailed Oct. 6, 2012 in parent U.S. Appl. No. 12/035,807.
Notice of Allowance mailed Feb. 2, 2012 in parent U.S. Appl. No. 12/035,807.
Notice of Allowance mailed Aug. 4, 2011 in parent U.S. Appl. No. 12/035,807.
Office Action mailed Sep. 29, 2011 in parent U.S. Appl. No. 12/035,807.
Office Action mailed Oct. 6, 2010 in parent U.S. Appl. No. 12/035,807.
Office Action mailed Apr. 15, 2011 in parent U.S. Appl. No. 12/035,807.

* cited by examiner

Primary Examiner — Scott A Rogers
(74) Attorney, Agent, or Firm — Staas & Halsey LLP

(57) ABSTRACT

An image forming apparatus and a method of controlling the same in which input image data is divided into blocks and color chrominance data of each block is analyzed thereby perform a print job by automatically detecting whether an image should be print in color or pure black.

14 Claims, 12 Drawing Sheets

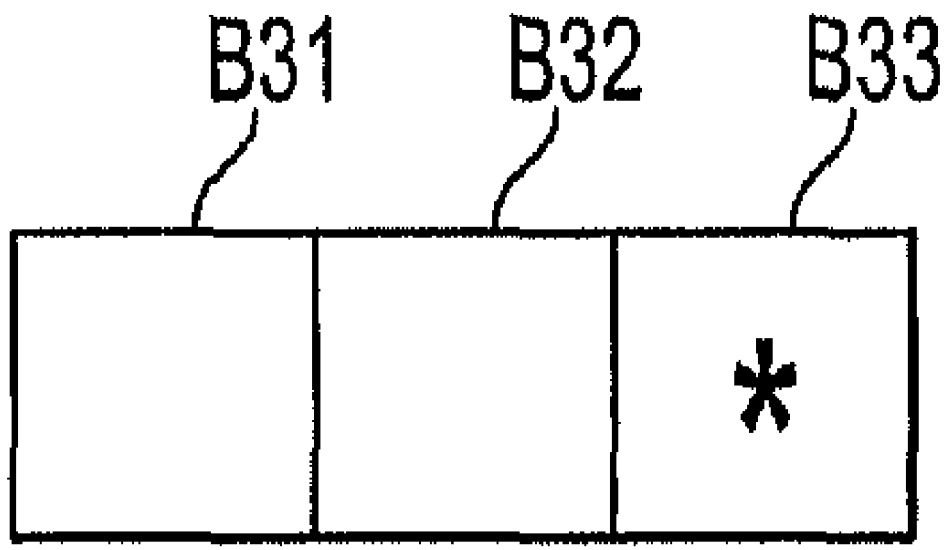

IMAGE FORMING APPARATUS ANALYZING COLOR CHROMINANCE DATA TO DETERMINE TYPE OF DOCUMENT TO BE PRINTED

CROSS-REFERENCE TO RELATED APPLICATION

This application is a continuation application of application Ser. No. 12/035,807, filed Feb. 22, 2008, now U.S. Pat. No. 8,194,284 and is related to and claims the benefit of Korean Patent Application No. 2007-20266, filed Feb. 28, 2007, in the Korean Intellectual Property Office, the disclosure of which is incorporated herein by reference.

BACKGROUND OF THE INVENTION

1. Field of the Invention

Aspects of the present invention relate to an image forming apparatus and a method for controlling the same, which analyze image data to automatically and discriminately detect whether the image should be printed in color or with pure black.

2. Description of the Related Art

Image forming apparatuses, such as a digital multi-function printer (DMFP) and a copy machine, may obtain an image through a scanning operation of a sensor or receive the image from an external device, such as a host computer. In addition, in the image forming apparatuses, the obtained image is subject to color-coordinate transformation so that the image may be printed by a printer engine.

FIG. 1 shows an example image forming apparatus. Such an image forming apparatus includes an image input unit 10, an image processing unit 20, a storage unit 30, and a printer engine 40. Referring to FIG. 1, an image input unit 10 provides red, green, and blue (RGB) data of a document image to an image processing unit 20. Here, as an example, the image input unit 10 obtains a scanned image using an image sensor, such as, a charge coupled device (CCD) or a contact image sensor (CIS).

The image processing unit 20 includes a memory 21 to store the RGB data of the document image, a color coordinate transformer 22 to transform the RGB data received from the memory 21 into cyan, magenta, yellow, and black (CMYK) data for printing, and a binary converter 23 to convert the CMYK data into binary CMYK data. The binary CMYK data on a printable medium converted by the image processing unit 20 is provided to a printer engine 40 through a storage unit 30. The printer engine 40, having received the CMYK data, prints the CMYK data so as to reproduce the image.

When the image processing unit 20 performs the color coordinate transformation, a portion of a black-and-white image may be erroneously converted into a color image due to characteristics of sensors used for obtaining an image. In such case, a printed result may have color components different from those of an original image. For this reason, when black letters are printed, color components may exist thereby degrading readability of the printed result. When a user inputs a color printing command, even though an image includes only black letters, the image forming apparatus uses a composite black color in order to print the image on a printable medium. However, the composite black deteriorates the readability of the printed result as compared to a pure black color.

When an image forming apparatus equipped with an auto-document feed (ADF) function duplicates color documents together with black-and-white documents, the user must manually set the color types of the documents to be duplicated thereby causing inconvenience to the user. For this reason, a method of performing printing operations by automatically detecting the type of the documents is necessary.

Japanese Unexamined Patent Publication No. 9-277606 discloses a color printer which prints input color data using only black color when RGB components of the input color data have the same value. However, according to this conventional method, if a black-and-white document has a color stain, such as, a thin line drawn by a red pen, the black-and-white document cannot be completely reproduced. Accordingly, RGB component must be inspected with respect to all pixels in the image data of the document.

SUMMARY OF THE INVENTION

Accordingly, aspects of the present invention have been made to address the above-mentioned and/or other problems, and aspects of the present invention provide an image forming apparatus and a method for controlling the same, which analyze image data so as to perform printing work by automatically and discriminately detecting and determining whether the image data should be printed in color or pure black.

According to an aspect of the present invention, there is provided an image forming apparatus including a printer engine to receive color data and to print a document, an image input unit to input image data of the document, and an image processing unit to perform color coordinate transformation with respect to the image data of the document, and to determine a type of the document based on a color chrominance signal of the transformed image data.

According to another aspect of the present invention, there is provided a method for controlling an image forming apparatus having a printer engine to receive color data to print a document, comprising inputting image data of the document, color-coordinate transforming the image data of the document, determining a type of the document based on a color chrominance signal of the transformed image data, and printing the document using the printer engine according to the type of the document.

According to another aspect of the present invention, a method of controlling an image forming apparatus is provided, comprising color-coordinate transforming image data of the document; determining a type of the document to be one of a color document, a black-and-white document, and a mixed document based on a color chrominance signal of the transformed image data; and printing the document using the printer engine according to the type of the document.

According to another aspect of the present invention, an image forming apparatus is provided, comprising an image input unit to convert a document into image data; an image processing unit to convert the image data into luminance and color chrominance data and print color data, the image processing unit comprising: a first color coordinate transformer to convert the image data into the luminance and color chrominance data, a second color coordinate transformer to convert the luminance and color chrominance data into print color data, a binary converter to the luminance data received from the first color coordinate transformer and the print color data received from the second color coordinate transformer into binary data, a detector to determine whether the document is a color document, black-and-white document, or a mixed document according to analysis the color chrominance data received from the first color coordinate transformer, a storage unit to store the luminance and color chrominance data and the print color data; and a printer engine to print the document according to whether the document is a color document, black-and-white document, or a mixed document.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 5 and 6 are graphs showing the determination of the type of the document based on a block according to aspects of the present invention, in which FIG. 5 shows first color chrominance signals for 64 pixels in a block and FIG. 6 shows second color chrominance signals for 64 pixels in a block;

FIGS. 8A to 8D are views showing relationships between blocks according to aspects of the present invention, in which FIG. 8A shows the relationship between two blocks adjacent to each other in a horizontal direction, FIG. 8B shows the relationship between three blocks adjacent to each other in a horizontal direction, FIG. 8C shows the relationship between two blocks adjacent to each other in a vertical direction, and FIG. 8D shows the relationship between three blocks adjacent to each other in a vertical direction according to aspects of the present invention.

DETAILED DESCRIPTION OF THE EMBODIMENTS

Figure 1:
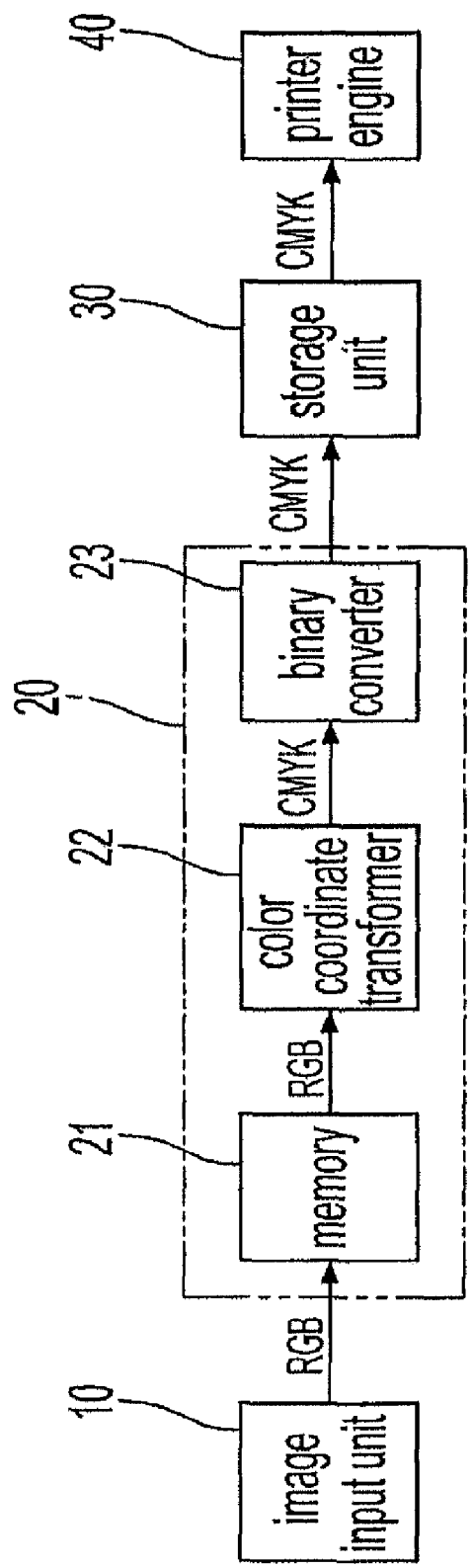
FIG. 1 is a block diagram of a conventional image forming apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
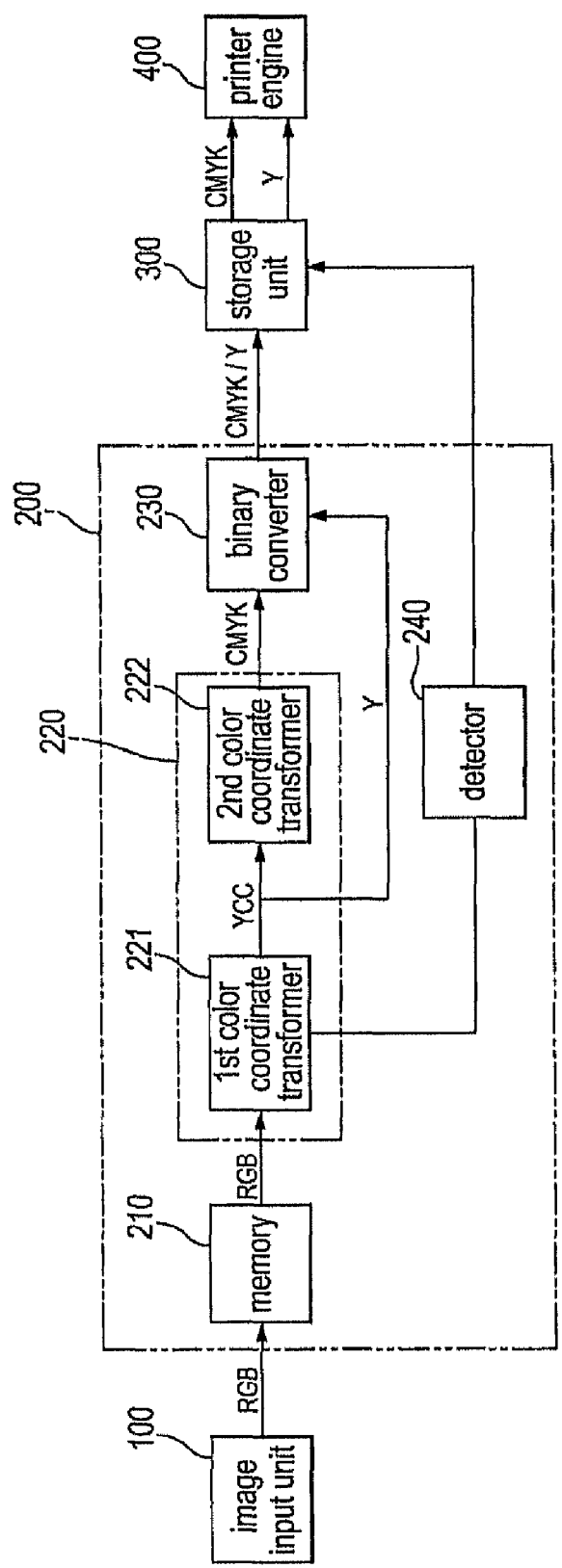
FIG. 2 is a block diagram of an image forming apparatus according to aspects of the present invention.

FIG. 2 is a block diagram showing the structure of processing an image obtained through a scanner in an image forming apparatus according to aspects of the present invention. The image forming apparatus 200 includes an image input unit 100, an image processing unit 200, a storage unit 300, and a printer engine 400. Referring to FIG. 2, an image input unit 100 provides RGB data of the image to an image processing unit 200. The image input unit 100 may obtain a scanned image using a charge coupled device (CCD) or a contact image sensor (CIS). Further, the input image unit 100 may provide the RGB data of the image to the image processing unit 200 from an electronic image sent to the image forming apparatus 200 via a wired or wireless network; from a hand-held device, such as a camera, a personal digital assistant, a digital media player; or from a personal computer, a laptop computer, or a server.

The image processing unit 200 includes a memory 210 to store the RGB data of the image, a color coordinate transformer 220 to transform the RGB data obtained from the memory 210 into CMYK data for printing, a binary converter 230 to convert the CMYK data into binary data, and a detector 240 to determine whether the image is to be reproduced as a black-and-white document or a color document. If the image is to be reproduced as a black-and-white document, only pure black is used to print the reproduction. However, if the image is to be reproduced in color, multiple colors are used to print the reproduction. Further, the image may be determined to be reproduced in black-and-white (or with pure black) for one area of the image and reproduced in color for another area of the image.

The color coordinate transformer 220 includes a first color coordinate transformer 221 and a second coordinate transformer 222 in order to obtain the CMYK data from the RGB data. The first color coordinate transformer 211 transforms the RGB data into luminance and color chrominance (YCC) data, and the second color coordinate transformer 222 transforms the YCC data into CMYK data.

Figure 3:
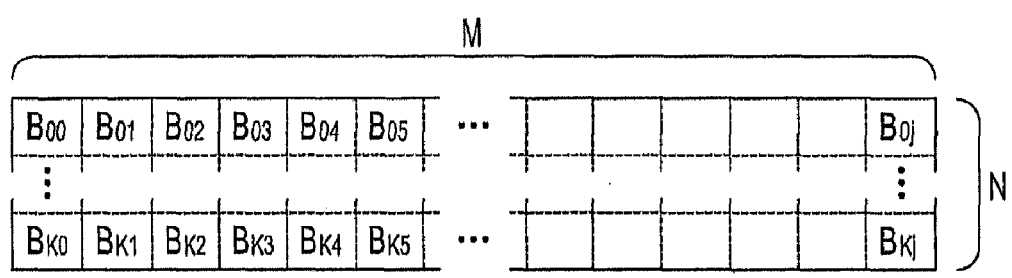
FIG. 3 is a illustrates the dividing of the scanned document image data into blocks according to aspects of the present invention.
Figure 4:
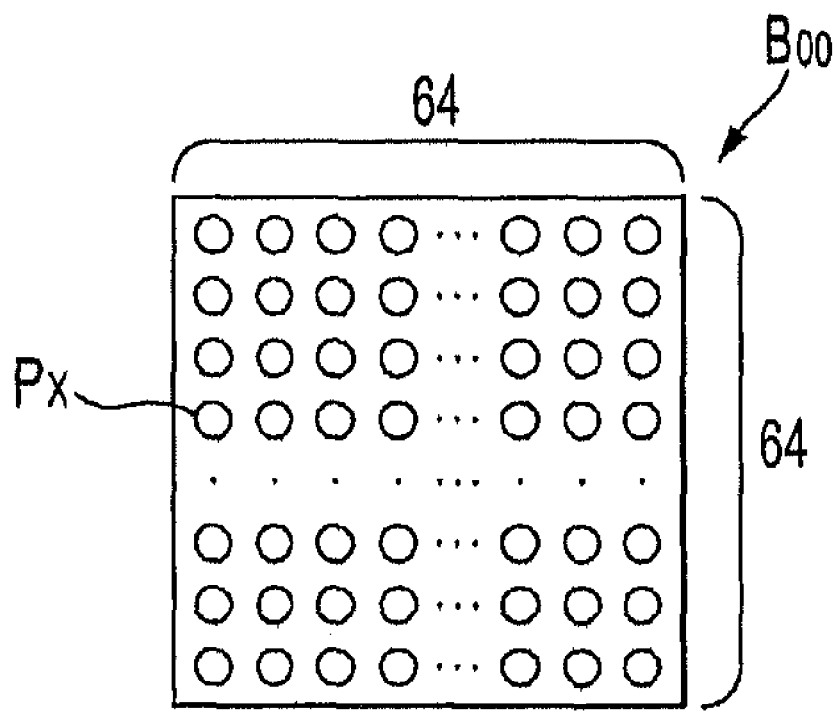
FIG. 4 is a view showing a predetermined block including 64 pixels according to aspects of the present invention.

The detector 240 receives the YCC signals from the first color coordinate transformer 221 and divides the YCC signals into M×N blocks as shown in FIG. 3. In this case, each block of the M×N block (e.g., a first block $B_{00}$ positioned at 1st column j and 1st row K) includes 64 pixels Px arranged in a square as shown in FIG. 4. As such, the YCC signals from the first color coordinate transformer 221 may be divided by the detector into as many M×N blocks as necessary. Further, it is understood that each block of the M×N block may be divided into any number of blocks $B_{Kj}$, K and j need not be equal, and the blocks $B_{Kj}$ may include any number of pixels Px, which need not be arranged in a square.

Figure 5:
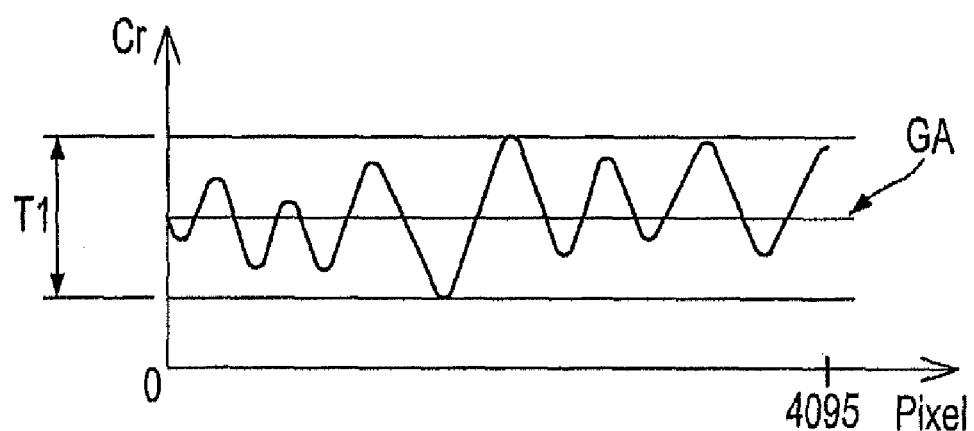
Figure 6:
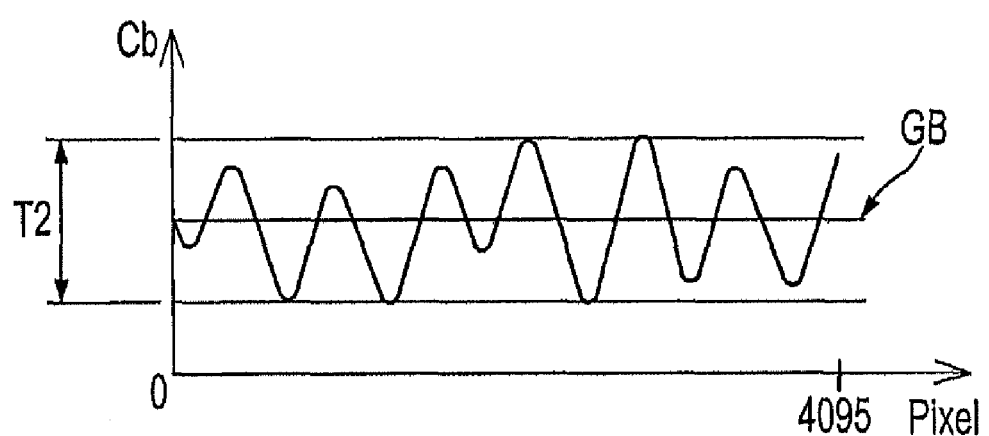

Referring again to FIG. 2, the detector 240 receives a luminance signal (Y) and two color chrominance signals (Cr and Cb) for each pixel Px from the first color coordinate transformer 221, and calculates average values of each of the color chrominance signals (Crs and Cbs) for each block $B_{Kj}$. Referring to FIG. 5, the color chrominance signals (Crs) for 64 pixels Px corresponding to pixel numbers 0 to 63 in each block fluctuate about the average value (GA) thereof. In addition, referring to FIG. 6, the color chrominance signals (Cbs) for 64 pixels corresponding to pixel numbers 0 to 63 in each block are fluctuate about the average value (GB) thereof.

If the color chrominance signals for the 64 pixels Px in one of the blocks $B_{Kj}$ are within the preset range (T1 and T2) including the respective average values (GA and GB) of the color chrominance signals (Crs and Cbs), the detector 240 determines that the corresponding block $B_{Kj}$ represents reproduction as a black-and-white document. If the intensities of the color chrominance signals for the 64 pixels Px are not within the preset ranges (T1 and T2), the detector 240 determines that the block $B_{Kj}$ represents reproduction as a color document. As the color chrominance signals (Crs and Cbs) fluctuate about the averages (GA and GB) within the preset ranges (T1 and T2) in FIGS. 5 and 6, the image would be determined to be reproduced as a black-and-white document. However, aspects of the present invention are not limited thereto such that if the color chrominance signals (Crs and Cbs) fluctuated about the averages (GA and GB) within the preset ranges (T1 and T2), the image could be determined to be reproduced as a color document. Further, as described below with regard to FIG. 7, the color chrominance signals may indicate that areas of adjacent blocks are all in color while another area of adjacent blocks are in black-and-white such that the former area would be printed in color and the latter area would be printed in black-and-white.

The detector 240 may calculate average values (GA and GB) of the color chrominance signals (Crs and Cbs) with respect to several blocks $B_{Kj}$ of an original image and may determine the type of the original image based on the average values. If all of the blocks $B_{Kj}$ represent reproduction as a black-and-white document (i.e., the intensities of the color chrominance signals (Crs and Cbs) are within the preset ranges (T1 and T2)), the detector 240 determines the original image is to be reproduced as a black-and-white document. If it is determined that a number of blocks $B_{Kj}$ represent reproduction as a color document (i.e., the intensities of the color chrominance signals (Crs and Cbs) are not within the preset ranges (T1 and T2)) compared to a number of all of the blocks $B_{Kj}$ is not greater than the preset number of blocks $B_{Kj}$, the relationship between the blocks is analyzed as described below. Although described as determining the type of reproduction of an image based on both the color chrominance signals (Crs and Cbs), it is understood that the type of document may be determined according to one of the color chrominance signals (Crs and Cbs).

Figure 7:
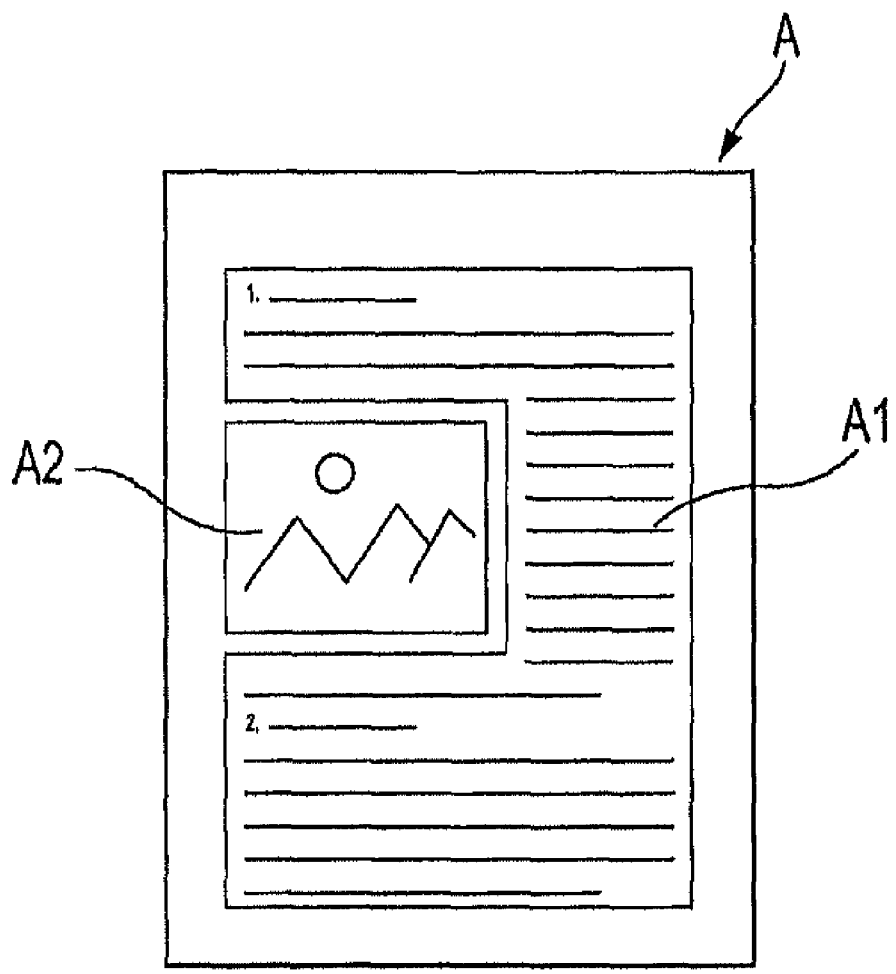
FIG. 7 is a view showing a document image including a black-and-white image and a color image according to aspects of the present invention.

As shown in FIG. 7, a document A includes a first area A1 containing a black-and-white image and a second area A2 containing a color image, and each area may be divided into the M×N blocks which include the blocks $B_{Kj}$. If a block $B_{Kj}$ representing reproduction as a color document exists, the detector 240 determines based on the relationship between the block $B_{Kj}$ and neighboring blocks (such as $B_{K(j+1)}$ or $B_{(K-1)j}$) whether the document is to be reproduced as a black-and-white document having only the first area A1 or the document is to be reproduced as a color document having the second area A2. Furthermore, the detector 240 may determine that the image is a mixed image having both the first area A1 and the second area A2, in which case the image is to be reproduced such that the second area A2 is reproduced in color and the first area A1 is reproduced in pure black.

Figure 8A:
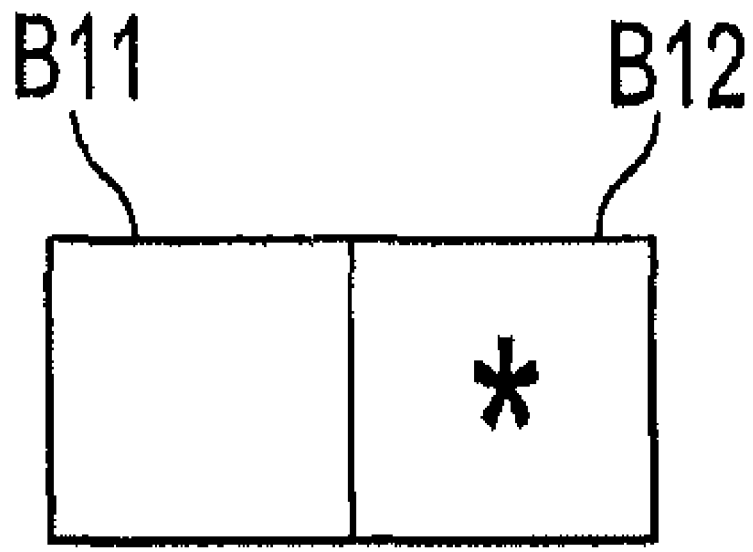
Figure 8C:
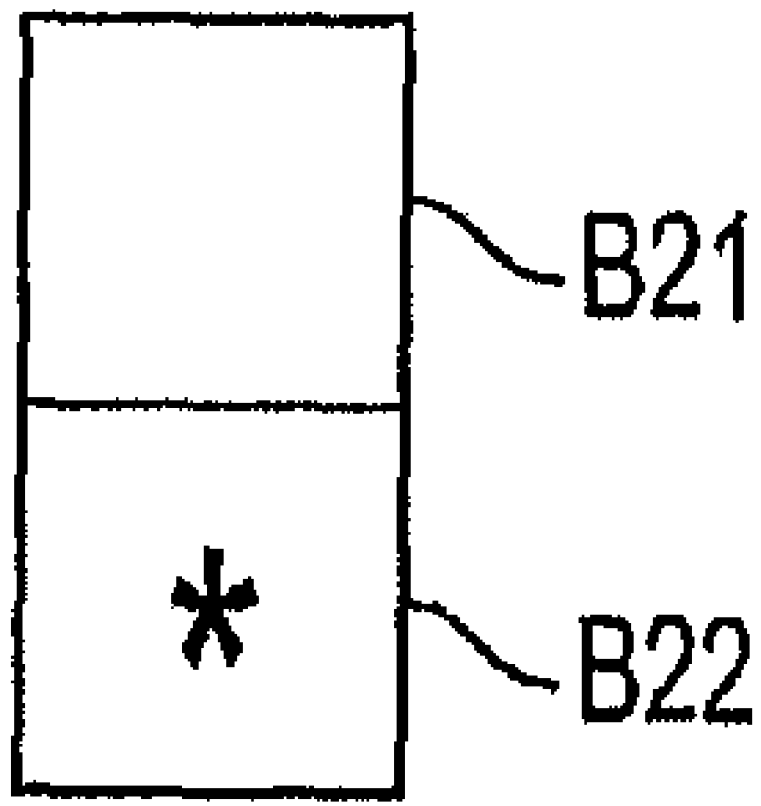
Figure 8D:
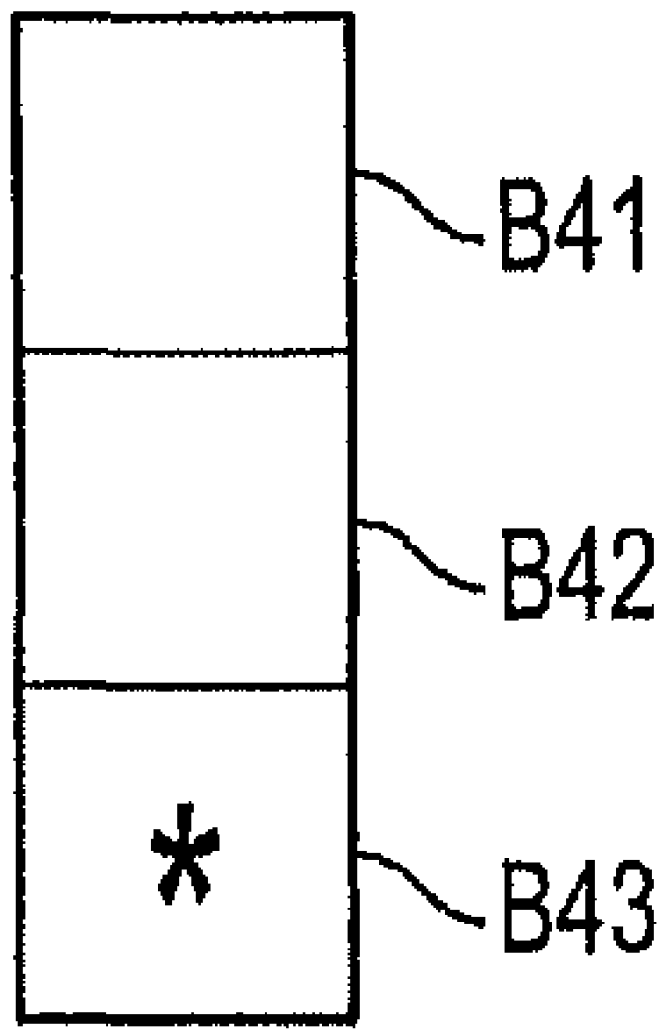

The relationship between blocks can be represented as a determination of degree of color for an image, and the relationship between neighboring blocks may be variously represented. Four typical cases will be described below according to aspects of the present invention. In other words, FIG. 8A shows the relationship between two blocks adjacent to each other in a horizontal direction, FIG. 8B shows the relationship between three blocks adjacent to each other in a horizontal direction, FIG. 8C shows the relationship between two blocks adjacent to each other in a vertical direction, and FIG. 8D shows the relationship between three blocks adjacent to each other in a vertical direction. Specifically in FIG. 8A, block B11 is horizontally adjacent to block B12, and block B12 is recognized as representing color reproduction. In FIG. 8B, block B31 is immediately and horizontally adjacent to block B32, and block 32 is immediately and horizontally adjacent to block B33, which is recognized as representing color reproduction. In FIG. 8C, block B21 is vertically adjacent to B22, which is recognized as representing color reproduction. In FIG. 8D, block B41 is immediately and vertically adjacent to block B42, and block B42 is immediately and vertically adjacent to block B43, which is recognized as representing color reproduction. It is understood that blocks $B_{Kj}$ may be adjacent without being immediately adjacent and that blocks $B_{Kj}$ may be other than horizontally and vertically adjacent.

The detector 240 may determine that the input image is to be reproduced as a color document based on the relationships between the blocks $B_{Kj}$. In detail, the type input image (i.e., color or black-and-white) may be determined according to the number of blocks in which color reproduction is represented. In other words, if the number of blocks in which color is present is greater than the predetermined number, the detector 240 determines that the image is to be reproduced as a color document. If the number of the blocks in which color is present is not greater than the predetermined number, the detector 240 determines that the image is to be reproduced as a black-and-white document. Such determination allows for determining whether the image should be reproduced in color or pure black even if a portion of the document has a trivial color contamination.

However, it is understood that the image forming apparatus is not limited to only the determination between color and black-and-white and may also determine the degree of color present in an image and use the degree of color to reproduce the image. For example, the detector 240 may determine that the document A of FIG. 7 includes a first area A1 containing a black-and-white image and a second area A2 containing a color image. As such, the first area A1 may be printed as if the whole of document A was a black-and-white document, and the second area A2 may be printed as if the whole of document A was a color document.

Referring back to FIG. 2, the detector 240 provides a detection signal to the binary converter 230 in order to discriminate whether the input image is to be reproduced as in color or pure black according to the determination result as described above. The binary converter 230 converts luminance data (Y) received from the first color coordinate transformer 221 into binary data by receiving the luminance data (Y) from the first color coordinate transformer 221 and then provides 1-channel binary data to the storage unit 300. In addition, the binary converter 230 that converts CMYK data into binary data by receiving the CMYK data from the second color coordinate transformer 222 and provides 4-channel binary data to the storage unit 300.

The storage unit 300 individually stores the 1-channel binary data for the luminance data and the 4-channel binary data for the CMYK data, and provides the 1-channel binary data or the 4-channel binary data to the printer engine 400 according to the detection signal received from the detector 240.

If the printer engine 400 receives the 1-channel binary data, the printer engine 400 performs a printing operation by using a pure-black color so as to improve the readability of a resultant black-and-white document. If the printer engine 400 receives the CMYK data, the printer engine 400 performs a typical printing operation so as to reproduce the color input image as a color document. However, it should be understood that the detection signal provided to the binary converter 230 from the detector 240 may discriminate between portions of color and portions of black and white such that the first area A1 of the document A of FIG. 7 would be printed using the pure-black color via the 1-channel binary data received by the printer engine 400 from the storage unit 300 while the second area A2 of the document A of FIG. 7 would be printed using color via the 4-channel binary data for the CMYK data received by the printer engine 400 from the storage unit 300. As such, the black-and-white portion of the document (i.e., the first area A1) is printed so as to improve the readability of the black-and-white portion while the color portion is reproduced with appropriate color.

Figure 9:
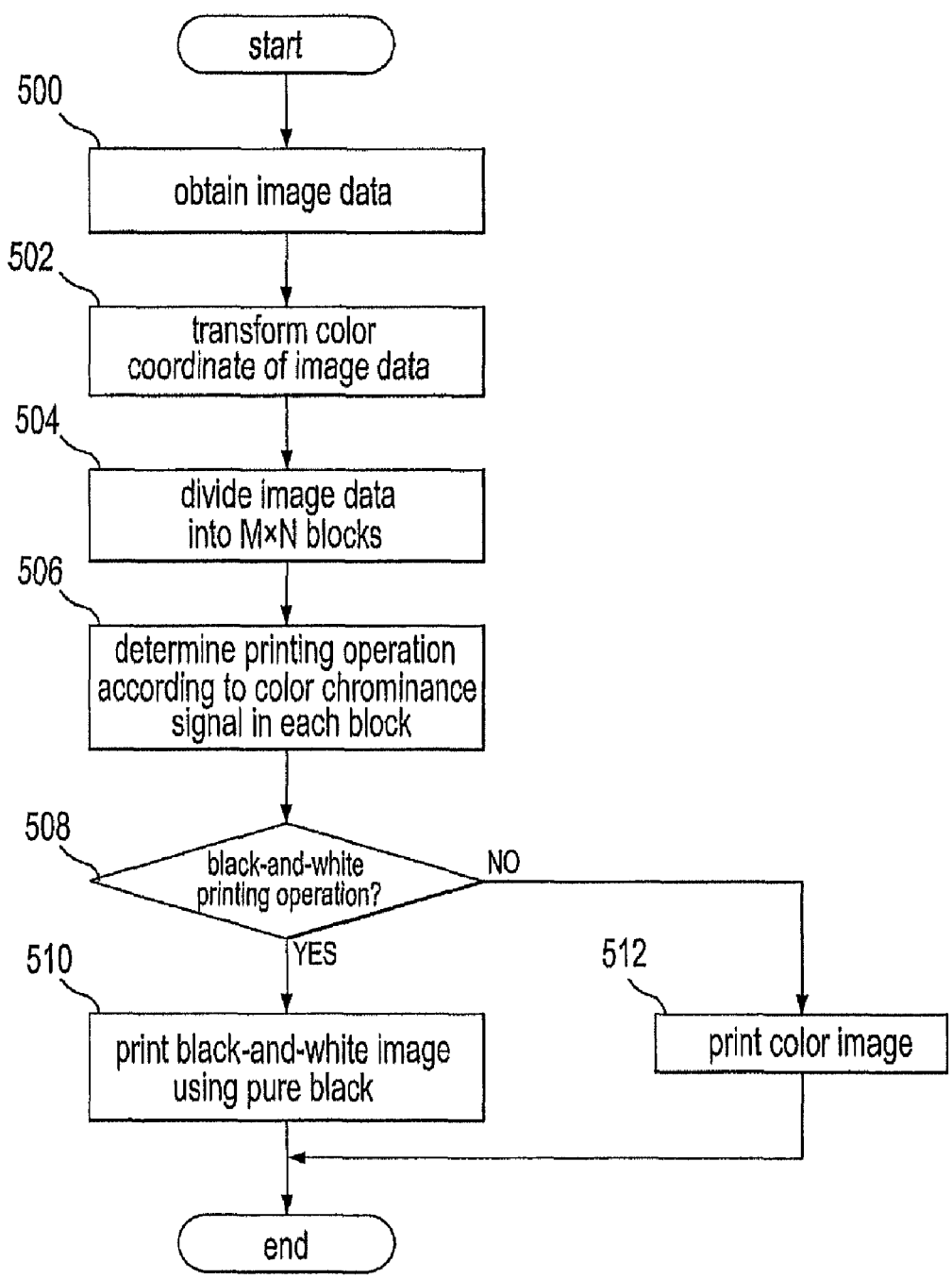
FIG. 9 is a flowchart showing the operational control of an image forming apparatus according to aspects of the present invention.

Hereinafter, a method for controlling the image forming apparatus according to aspects of the present invention will be described with reference to FIG. 9. Input image data of an image is obtained through the image input unit 100 and then provided to the image processing unit 200 (operation 500). The image processing unit 200 transforms the color-coordinate data of the input image data into CMYK data and YCC data for printing. According to aspect of the current invention, the first color coordinate transformer 221 transforms the RGB data of the input image data into luminance and color chrominance (YCC) data, and the second color coordinate transformer 222 transforms the luminance and color chrominance (YCC) data into the CMYK data (operation 502).

The detector 240 receives the YCC data from the first color coordinate transformer 221 and divides the YCC data into M×N blocks (operation 504). Then, in operation 506, the detector 240 calculates average values of chrominance signals with respect to plural blocks of the input image data so as to determine the type of or the degree of color of the input image data based on the average values. If the all blocks represent reproduction as a black-and-white document, the input image is reproduced as a black-and-white document. If a number of the blocks in which color is present is not greater than a predetermined number, the relationship between the blocks is analyzed so as to determine sizes of portions in which color is present or in which only black is present. As such, the entire document may not be printed in color although an errant color mark may be present on a small portion of the document. Then, the type of document or the degree of color of the document is determined according to the analyzing result (operation 506).

The detector 240 determines whether the input image is to be reproduced as a black-and-white document (operation 508). If the input image is to be reproduced as a black-and-white document, a detection signal corresponding to the black-and-white input image is applied to the storage unit 300 so that the printer engine 400 prints the black-and-white document by using a pure black color (operation 510). If the input image is determined to be reproduced as a color document, a detection signal corresponding to the color input image is applied to the storage unit 300, so that the printer engine 400 typically prints the color document using plural colors (operation 512). In another aspect, the detector 240 determines that portions of the input image are black-and-white while other portions of the input image are color so that the detector 240 applies a detection signal containing information as to which areas of the input image are to be printed with pure black and which areas of the document are to be printed with plural colors.

As described above, according to aspects of the present invention, input image data are divided into blocks, and color chrominance data of the blocks is analyzed with respect to each block to thereby exactly determine whether the input image is to be reproduced as a color document or a black-and-white document. According to aspects of the present invention, since the method of reproduction of the input image is determined based on the relationship between blocks, erroneous determination caused by color contamination can be prevented. In addition, according to aspects of the present invention, even if a user unsuitably sets a color duplication command for a black-and-white document, the black-and-white document can be printed by using a pure black color, so that the readability of the document can be improved as compared with that of the document printed using a composite black color. Further, the detector can provide information regarding areas of the input image containing color and areas of the input image containing only black and white so that different areas of the image can be reproduced using plural colors and black, respectively.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus of comprising:
   an image input unit through which image data is input to the image forming apparatus; and
   an image processing unit to perform color coordinate transformation of the input image data to thereby produce transformed image data and to determine the type of a document to be printed in printing operation according to a color chrominance signal of the transformed image data,
   wherein the image processing unit comprises:
   a first color coordinate transformer to transform the input image data into luminance and color chrominance data of the document, and
   a detector to analyze color chrominance data of the luminance and color chrominance data to determine the type of a document to be printed in printing operation.

2. The image forming apparatus of claim 1, wherein the image processing unit further comprises a second color coordinate transformer to transform the luminance and color chrominance data into color data.

3. The image forming apparatus of claim 1, wherein the detector divides the color chrominance data into blocks, and the detector further divides the color chrominance data in each block into pixels.

4. The image forming apparatus of claim 3, wherein the detector determines the printing operation to be a black-and-white operation if the color chrominance data for all of the pixels in each block is within a preset range based on an average value of the color chrominance data for all pixels in each block.

5. The image forming apparatus of claim 3, wherein the detector determines the printing operation to be a color operation if a number of blocks in which the color chrominance data for all of the pixels in each block is outside of a preset range based on average values of the color chrominance data for all pixels in each block, is greater than a predetermined number.

6. The image forming apparatus of claim 5, wherein the detector determines the printing operation by analyzing relationships between blocks if the number of the blocks in which the color chrominance data for all of the pixels in each block is outside of the preset range is equal to or less than the predetermined number.

7. The image forming apparatus of claim 6, wherein the detector determines areas of the document as a having number of blocks consecutively representing a same printing operation.

8. The image forming apparatus of claim 7, wherein the detector analyzes the blocks in a horizontal direction or in a vertical direction.

9. The image forming apparatus of claim 1, wherein the luminance and color chrominance data comprises a first color chrominance and a second color chrominance, and the detector individually analyzes the first color chrominance and the second color chrominance.

10. The image forming apparatus of claim 3, wherein the blocks comprise pixels arranged in a square.

11. The image forming apparatus of claim 2, wherein the transformed image data comprises:
   the color data received from the second color coordinate transformer; and
   luminance data of the luminance and color chrominance data received from the first color coordinate transformer, and the image processing unit further comprises a binary converter to convert the transformed image data into binary data.

12. The image forming apparatus of claim 11, further comprising a storage unit to individually store binary data of the color data as four-channel binary data and binary data of the luminance data as one-channel binary data, the four-channel binary data and the one-channel binary data being received from the binary converter.

13. The image forming apparatus of claim 12, further comprising a printer engine coupled to receive the transformed image data and print an image on a printable medium according to the received transformed image data,
wherein the storage unit selectively provides the four-channel binary data and the one-channel binary data to the printer engine according to the determination of the printing operation by the detector.

14. The image forming apparatus of claim 13, wherein the four-channel binary data is provided to the printer engine when the detector determines that the printing operation is a color printing operation, and the one-channel binary data is provided to the printer engine when the detector determines that the printing operation is a black-and-white printing operation.

\* \* \* \* \*